United States Patent [19]

Ullman

[11] 4,307,435

[45] Dec. 22, 1981

[54] RADIO FREQUENCY SIGNAL AND POWER DISTRIBUTION DUCT

[76] Inventor: Allan Ullman, 22 Highland Ave., Sea Cliff, N.Y. 11579

[21] Appl. No.: 163,886

[22] Filed: Jun. 27, 1980

[51] Int. Cl.³ .......................... H02B 7/00; H02B 9/00
[52] U.S. Cl. .................................... 361/334; 361/358; 339/22 R
[58] Field of Search ...................... 455/6, 132; 358/86; 340/693; 339/22 R, 20, 23; 361/331, 332, 334, 346, 358, 356, 359, 378, 392–394, 420, 422

[56] References Cited

U.S. PATENT DOCUMENTS

| | | | |
|---|---|---|---|
| 3,806,858 | 4/1974 | Larsile | 339/22 R |
| 4,032,821 | 6/1977 | Keiser | 361/334 |
| 4,080,644 | 3/1978 | Reed | 361/358 |

*Primary Examiner*—Gerald P. Tolin
*Attorney, Agent, or Firm*—Eugene E. Geoffrey, Jr.

[57] ABSTRACT

A radio frequency signal and power distribution duct for operation of a plurality of radio and television receivers which includes a dual compartment duct with spaced electric receptacles in one compartment and spaced interconnected matching and isolating networks in the other compartment. The ducts are arranged to be interconnected in end to end relationship and each duct is provided with a central ridged channel to engage cover holding machine screws at any point along the length thereof.

3 Claims, 7 Drawing Figures

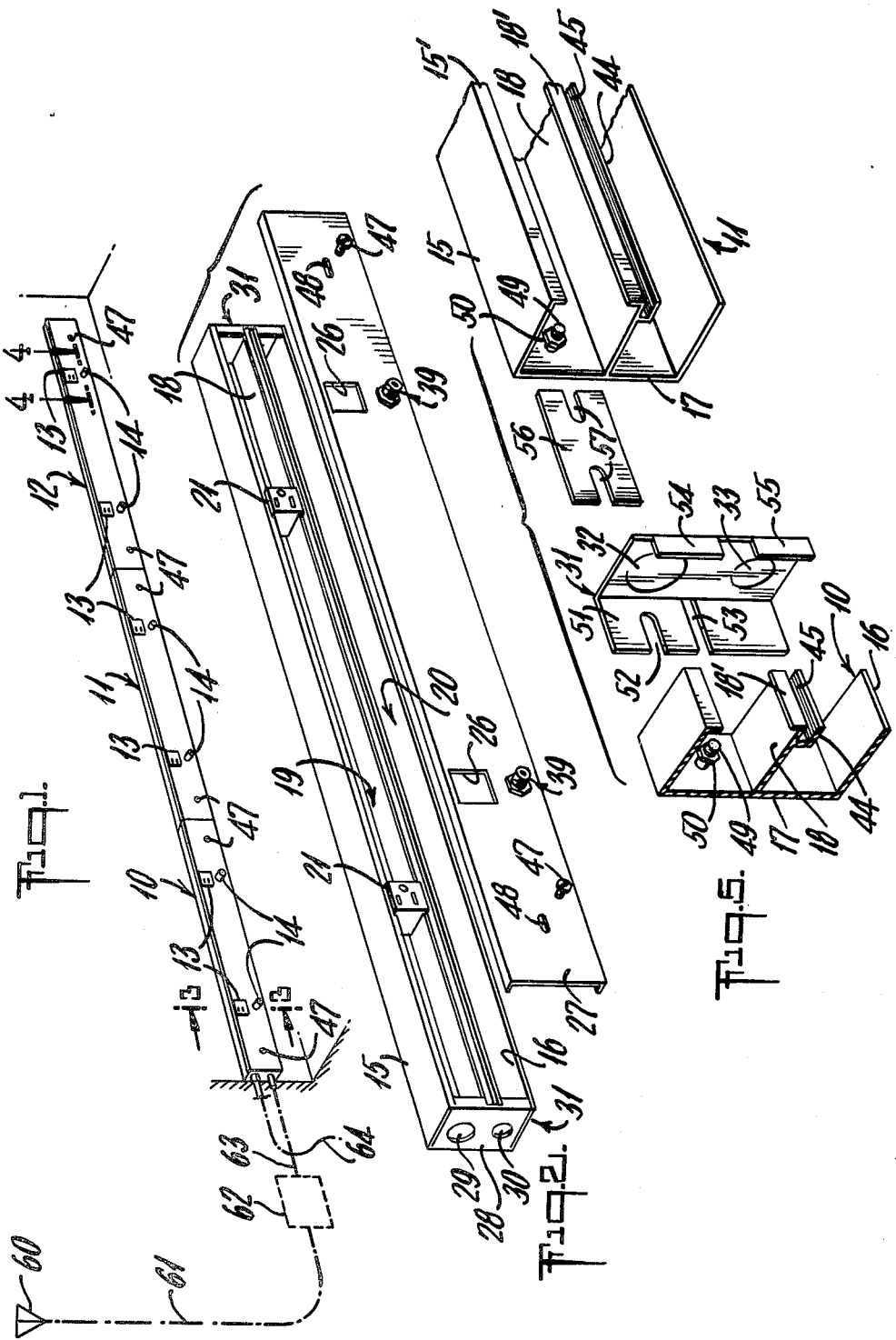

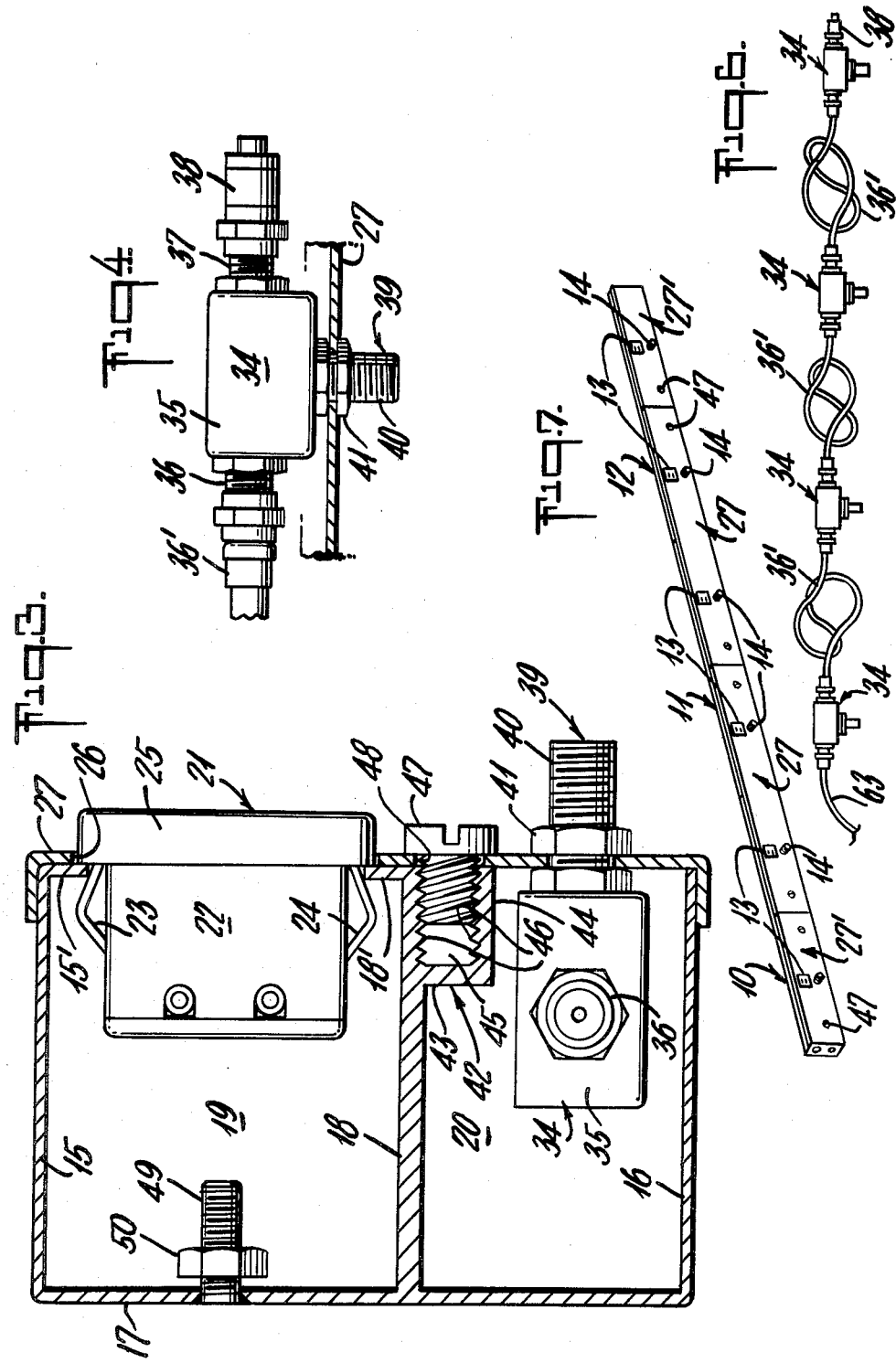

RADIO FREQUENCY SIGNAL AND POWER DISTRIBUTION DUCT

This invention relates to radio frequency multicoupler and power supply distribution systems for operating a plurality of high frequency receivers such as television and radio receivers and more specifically to a novel and improved signal and power distribution duct and circuitry particularly useful for supplying signals and power to a plurality of receivers for display in stores and other commercial establishments.

Numerous signal and power distribution systems for television and radio receivers have been used for operation of a plurality of receivers for purposes of demonstration but known systems are not only complicated and relatively difficult for many sales persons to use, but the wiring and specifically power supplying cables can create hazardous conditions if improperly handled.

This invention overcomes the problems heretofore encountered in providing radio frequency signals and power to a plurality of receivers and provides a novel and improved metal duct or track housing both signal and power circuits shielded one from the other and spaced signal and power receptacles for connection to individual receivers and wherein track sections may be mechanically and electrically coupled in end to end relationship to accommodate any desired number of receivers without interference one with the others.

Another object of the invention resides in the provision of a novel and improved duct or track for the supply of radio frequency signals and power to a plurality of receivers that is characterized by its simplicity, relatively low cost and ease of installation to meet specific requirements of the user.

Still another object of the invention resides in the provision of a novel and improved signal and power supplying track for radio and television receivers.

The invention comprises an elongated channel having a longitudinally disposed partition to form two parallel compartments and removable end plates to facilitate assembly of two or more sections in end to end relationship. One of the compartments has inwardly extending flanges for slidably receiving power receptacles and a cover is provided for the channel and carries spaced interconnected signal receptacles and adjoining openings through which the power receptacles protrude when the cover is in place on the channel. The longitudinal partition is formed with a longitudinal channel having serrated walls to threadably receive machine screws for securing the cover in place.

The above and other objects and advantages of the invention will become more evident from the following description and accompanying drawings forming part of this application.

IN THE DRAWINGS

FIG. 1 is a perspective view of a signal and power distribution duct according to the invention showing a plurality of duct sections joined one to the other;

FIG. 2 is an enlarged perspective view of one section of a signal and power distribution duct shown in FIG. 1;

FIG. 3 is an enlarged cross sectional view of FIG. 1 taken along the line 3—3 thereof;

FIG. 4 is an enlarged cross sectional view of FIG. 1 taken along the line 4—4 thereof;

FIG. 5 is an enlarged exploded perspective view of the ends of adjoining duct sections to illustrate the mode of attachment;

FIG. 6 is a diagrammatic view of the signal distribution system in accordance with the invention; and FIG. 7 illustrates a modified assembly of duct sections to insure maintenance of longitudinal alignment.

The signal and power distribution duct in accordance with the invention is specifically intended for use in stores and commercial establishments for providing radio frequency signals to a plurality of television and FM receivers derived from a single antenna and also providing power receptacles for energizing the receivers. With this arrangement, so-called "haywire rigging" of a plurality of receivers is avoided together with the danger that may accompany such procedure through the overloading of power outlets and the like. In addition, the duct provides adequate signal levels to all receivers and at the same time isolates the receivers so that there will not be any interaction of one receiver with any other receiver. The invention further isolates the signal distribution system from the power distribution system and provides a novel and improved structure which facilitates the attachment of a plurality of sections in end to end relationship to meet specific requirements of any given installation. Through a novel and improved structural arrangement, the sections can be secured one to the others in precise alignment with a result that the wiring within the individual sections is completely protected notwithstanding the nature or extent of use.

In the drawings, each of the individual duct sections has provision for the connection of two receivers. It is understood however that each section can be made of any desired length and can be arranged for the accommodation of more than two receivers.

Referring now to the drawings and more specifically to FIG. 1, it will be observed that the signal and power distribution duct is formed of three interconnected sections 10, 11 and 12 which are identical in structure and each of which may contain two or more sets of power and signal outlets denoted by the numerals 13 and 14. Since each of the sections 10 through 12 are identical, only section 10 has been illustrated in FIG. 2. The body of the duct section 10 includes side walls 15 and 16, a bottom wall 17 and a longitudinal partition 18 which divides the duct into two separate longitudinal compartments 19 and 20. The side wall 15 has an inwardly extending flange 15' and the longitudinal partition 18 has a flange 18' extending toward the flange 15' to support electrical power receptacles generally denoted by the numeral 21. While the receptacles 21 may be arranged to handle any desired power requirement, the illustrated receptacles are shown as conventional 120 volt receptacles with an independent ground terminal. Since these receptacles are well known in the art, further description is not deemed necessary.

Each receptacle 21 has a body portion 22 of a width slightly less than the distance between the flanges 15' and 18' and is provided with outwardly extending spring members 23 and 24. The outer face 25 of the receptacle 21 is of greater width than the body 22. With this arrangement when a receptacle 21 is positioned between the flanges 15' and 18', the springs 23 and 24 will compress to permit the receptacle portion 25 to seat against the outer faces of the flanges and at the same time the springs will then expand, as illustrated more clearly in FIG. 3, to hold the receptacle in position against the flanges 15' and 18'. With this arrangement, the receptacles can be slidably positioned within the compartment 19 in order to insure precise alignment with the receptacle openings 26 in the cover 27. The receptacles 21 are preferably wired in parallel prior to installation in the compartment 19 by conductors not illustrated since such wiring is conventional in the art. The end wall 28 of the duct 10 has a pair of knock-out openings 29 and 30 for the attachment of suitable connectors. The opening 29 accommodates a conventional electrical connector for affixing a power supplying cable thereto while the opening 30 accommodates a radio frequency cable for feeding signals to the radio frequency outlets to be described. The corresponding end wall 31 is similar to the end wall 20 and is arranged with removable plugs or "knock-outs" 32 and 33 as shown more clearly in FIG. 5 so that signal and power cables can be attached to the duct at either end.

The radio frequency distribution system includes, in this embodiment of the invention, a pair of impedance matching network adaptors or outlets 34 as shown more clearly in FIG. 4. Each of the matching network adaptors has a metal housing 35 and coaxial connectors 36 and 37 for receiving an input coaxial cable generally denoted by the numeral 36' and an output coaxial cable or termination 38 as the case may be. In FIG. 4, the terminating network 38 is secured to the connector 37 since the matching network adaptor 34 would then be the last of the adaptors in the distribution system. In the case of the preceding adaptors 34, coaxial jumper cables as will be described in connection with FIG. 6 are utilized to couple successive adaptors. Each adaptor has a third connector 39 having a threaded shank 40 which extends through a hole in the cover 27 and is secured thereto by a suitable nut 41. A coaxial cable with a suitable connector is affixed to the threaded shank 40 and which automatically couples the central connector of the coaxial cable as well as the coaxial shield to the adaptor 34 for the transmission of signal energy to a specific receiver.

As is evident in the foregoing, the signal distribution circuitry is carried wholly by the cover 27 so that when the cover is positioned over the duct the signal distribution system is contained wholly within the compartment 20 and therefore shielded from the power distribution compartment 19.

In order to fix the cover 27 in position on the duct, the longitudinal partition 18 is provided with an integrally formed longitudinal channel generally denoted by the numeral 42 and includes a bottom wall 43 and a side wall 44. The walls 43 and 44 together with a portion of the partition 18 forms an elongated channel 45. The width of the channel 45 is arranged to accommodate a machine screw having a specific diameter and thread pitch and the opposing walls of the channel 45 are grooved or serrated as denoted by the numeral 46 so that the spaces between the grooves correspond to the pitch thread of the machine screw 47. The cover 27 is provided with two or more openings 48 to accommodate the machine screws 47 but the longitudinal positioning of the openings 48 is not critical since the channel 45 extends throughout the entire length of the duct and will accommodate the machine screws 47 at any location along the channel. This feature is particularly significant in an application such as that illustrated in FIG. 7 wherein it will be shown that in certain installations it is desirable to position the covers 27 to bridge adjoining sections to provide additional insurance against displacement of the sections one relative to another.

Referring now to FIG. 5 which illustrates fragmentary end portions of sections 10 and 11 as illustrated in FIG. 1, it will be observed that the end plates or closures 31 are removably carried by the associated ducts. For instance, in the case of the duct 10, the bottom wall of the compartment 19 carries a threaded stud 49 and cooperating nut 50. The end closure 31 has an inwardly extending flange 51 having a pair of slots 52 and 53. The slot 53 bridges the partition 18 and the slot 52 engages the stud 49. By tightening the nut 50, the closure 31 will be held in position on the duct. The upper edge of the closure has a pair of inwardly extending flanges 54 and 55 with the former extending between the flanges 15' and 18' and the latter extending between the wall 16 and the channel forming wall 44 to provide adequate support for the end edges of the cover 27. To couple the two ducts 10 and 11, the end closures 31 are removed as shown in FIG. 5 and the ends of the ducts are brought into adjoining relationship. At the same time, the connecting plate 56 having a pair of opposing slots 57 is positioned in engagement with the studs 49 of each of the ducts and the nuts are then tightened to secure the ducts one to the other and at the same time provide a positive electrical ground between the ducts. While not illustrated in the drawings, each of the duct sections is provided with a plurality of holes in the bottom wall 17 for securing the ducts to suitable supporting walls as illustrated generally in FIG. 1.

Referring to FIG. 6, it will be observed that each of the matching network adaptors is coupled to a preceding adaptor by an intervening length of coaxial cable 36'. The lengths of the cables 36' are approximately one-quarter of the wavelength of the average radio frequency to be distributed. The signal from the antenna 60 as illustrated in FIG. 1 is fed through a suitable high frequency lead-in 61 which may have any suitable impedance. Normally, the lead-in is a conventional 300 ohm line in which case a matching transformer 62 is utilized to transform the impedance to that of matching network adaptors 34 which may be conventionally 75 ohms. The 75 ohm cable 63 as shown in FIG. 1 couples the transformer 62 to the first matching network adapter 34 as illustrated in FIG. 6. The power cable is denoted by the numeral 64.

Referring now to FIG. 7, it will be observed that with the novel and improved distribution structure in accordance with the invention that the covers 27 may be arranged to bridge adjoining duct sections 10, 11 and 12. Under these conditions, partial cover sections 27' are used on each end of the assembly. With this arrangement, the covers 27 assist in retaining the duct sections 10, 11 and 12 in precise alignment one with the others and thus prevent accidental displacement of the duct sections which could result in the damage to either the signal or power distribution cabling.

Offsetting of the covers 27 in this embodiment of the invention can be readily affected without the necessity of providing new openings 48 in the covers 27 or providing precisely aligned openings in the cover sections 27'. This results by reason of the utilization of the ridged channel 45 which will accommodate machine screws 47 at any position along the length of the channel.

While only certain embodiments of the invention have been illustrated and described, it is understood that alterations, changes and modifications may be made without departing from the true scope and spirit thereof.

What is claimed is:

1. A signal distribution and power supplying duct for operation of a plurality of radio frequency receiving devices comprising an elongated U-shaped duct having a bottom wall and a pair of parallel side walls with one of said walls having an inwardly extending first flange along the edge thereof, a central longitudinal partition normal to and carried by the bottom wall of said duct, said partition forming two longitudinal compartments, removable end plates closing the ends of said duct, a second flange carried by the upper edge of said partition and extending in the direction of said first flange and substantially coplanar therewith, a longitudinally disposed L-shaped structure carried by said partition on the side opposite said second flange and forming with said partition a narrow elongated channel, V-shaped longitudinal ridges on the opposing walls of said channel with the ridges on one wall offset relative to the ridges on the other wall to accommodate and engage threaded machine screws, interconnected electrical receptacles slidably carried by said first and second flanges and extending into one of said compartments, a cover overlying said duct and having transversely aligned spaced pairs of openings with one opening of each pair engaging the periphery of a receptacle and locking it in position and the other opening aligned with the other of said compartments, a radio frequency adaptor including an isolation network mounted in the other opening of each pair, said adaptor having an output connector extending through said opening and two cable connectors, radio frequency cables interconnecting said cable connectors to feed radio frequency energy successively to each of said adaptors, said adaptors and radio frequency cable lying in the other of said compartments when said cover is in place on said duct, said cover further including a plurality of machine screw openings in alignment with said ridged channel and machine screws extending through the last said openings and threadably engaging said ridges to secure the cover in place.

2. A signal distribution and power supplying duct according to claim 1 wherein said end plates each include an inwardly extending slotted flange and each end portion of said duct includes a threaded stud extending from the bottom wall and a cooperating nut, said stud engaging said slot to hold the end plate in place whereby two ducts can be secured in end to end relationship by removing adjoining end plates and positioning a double slotted connector in engagement with the studs on the adjoining ends of said ducts.

3. A signal distribution and power supplying duct according to claim 2 wherein said pairs of openings are spaced at equal distances with the distance between each end opening and the end of said duct being equal to one-half the first said distances whereby the covers on adjoining ducts coupled in end to end relationship may be staggered to insure longitudinal alignment of adjoining ducts.

* * * * *